(12) United States Patent
Kuo et al.

(10) Patent No.: US 7,839,199 B2
(45) Date of Patent: Nov. 23, 2010

(54) CIRCUIT AND METHOD FOR IMPLEMENTING FREQUENCY TRIPLED I/Q SIGNALS

(75) Inventors: Chien-Nan Kuo, Hsinchu (TW); Huan-Sheng Chen, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 11 days.

(21) Appl. No.: 12/356,402

(22) Filed: Jan. 20, 2009

(65) Prior Publication Data

US 2010/0123507 A1  May 20, 2010

(30) Foreign Application Priority Data

Nov. 19, 2008  (TW) .............................. 97144627 A

(51) Int. Cl.
*G06F 7/44* (2006.01)
(52) U.S. Cl. ..................................... 327/356; 327/357
(58) Field of Classification Search ....................... None
See application file for complete search history.

(56) References Cited

U.S. PATENT DOCUMENTS

| | | | | |
|---|---|---|---|---|
| 6,041,250 A | * | 3/2000 | dePinto | 600/509 |
| 7,386,291 B2 | * | 6/2008 | Floyd et al. | 455/313 |
| 2004/0259518 A1 | * | 12/2004 | Aktas et al. | 455/323 |
| 2008/0051054 A1 | * | 2/2008 | Floyd et al. | 455/318 |

* cited by examiner

*Primary Examiner*—Cassandra Cox
(74) *Attorney, Agent, or Firm*—Peter F. Corless; Steven M. Jensen; Edwards Angell Palmer & Dodge LLP

(57) ABSTRACT

A circuit and a method for implementing frequency tripled I/Q signals are proposed, including receiving two input I/Q signals through frequency multipliers so as to generate two frequency multiplied signals and mixing the input I/Q signals and the corresponding frequency multiplied signals through mixers for generating and outputting two I/Q signals with a frequency three times that of the input I/Q signals. The invention eliminates the requirement for high amplitude of the input signals as in the prior art and has lower power consumption and broader bandwidth and can be used as high frequency signal sources in any single chip processes.

19 Claims, 3 Drawing Sheets

```
┌─────────────────────────────────────┐
│ the first input signal and the second input │
│ signal are respectively inputted through the │
│ first input terminal and the second input │
│ terminal and received by the first frequency │──500
│ multiplier and the second frequency │
│ multiplier, thereby generating the first │
│ frequency multiplied signal and second │
│ frequency multiplied signal │
└─────────────────────────────────────┘
                  │
                  ▼
┌─────────────────────────────────────┐
│ the first input signal and the second │
│ frequency multiplied signal are received │
│ and mixed by the first mixer and the │
│ second input signal and the first frequency │
│ multiplied signal are received and mixed │──501
│ by the second mixer, thereby generating │
│ the first output signal and the second │
│ output signal │
└─────────────────────────────────────┘
                  │
                  ▼
┌─────────────────────────────────────┐
│ the first output signal and the second output │──502
│ signal are outputted │
└─────────────────────────────────────┘
```

FIG. 5

CIRCUIT AND METHOD FOR IMPLEMENTING FREQUENCY TRIPLED I/Q SIGNALS

BACKGROUND OF THE INVENTION

1. Field of the Invention

The present invention relates generally to RF (Radio Frequency) IC (Integrated Circuit) designs, and more particularly to a circuit and a method for implementing frequency tripled I/Q signals in a broadband wireless communication system.

2. Description of Related Art

Currently, planning and technical standards for millimeter-wave bands such as IEEE 820.15.3c are under development, which could be applied in various types of commodities requiring short-distance high-speed communications in the future, such as HDMIs, high speed wireless data transmissions, vehicle collision warning radars and imaging techniques.

Therein, if voltage-controlled oscillators (VCO) are directly used in millimeter-wave bands for generating local oscillating signals, phase noises of the VCOs would be serious. Therefore, in general, voltage-controlled oscillators at lower frequency are used in combination with frequency multipliers so as to provide high frequency oscillating signals. Further, recent communication systems often require I/Q signal sources for frequency conversion. However, high frequency signal sources are difficult to design due to poor component quality. Accordingly, frequency multipliers can be utilized with lower frequency signal sources for frequency synthesis, thereby reducing the burden of PLLs (Phase-Locked Loop).

At present, a main method of generating a frequency multiplied signal involves making a transistor operate at a strong non-linear area so as to output a square wave and further filtering the square wave by a filter so as to obtain a signal with a desired frequency. However, such a method consumes great power and amplitudes of input signals must be high such that transistors can operate at a strong non-linear area, which accordingly lowers the efficiency.

Therefore, how to provide a circuit and a method for implementing frequency tripled I/Q signals in a broadband wireless communication system which eliminates the requirement for high amplitude of input signals and has a broader bandwidth and lower power consumption and can be used in any processes has become urgent.

SUMMARY OF THE INVENTION

According to the above drawbacks, an object of the present invention is to provide a circuit and a method for implementing frequency tripled I/Q signals without the requirement for high amplitude of input signals.

Another object of the present invention is to provide a circuit and a method for implementing frequency tripled I/Q signals with broader bandwidth.

A further object of the present invention is to provide a circuit and a method for implementing frequency tripled I/Q signals with lower power consumption.

Still another object of the present invention is to provide a circuit and a method for implementing frequency tripled I/Q signals that can be used as high frequency signal sources in any processes.

In order to attain the above and other objects, the present invention provides a circuit for implementing frequency tripled I/Q signals, wherein a first input signal with a frequency $f_0$ and a second input signal with a frequency $f_0$ and in quadrature with the first input signal are inputted to the circuit, the circuit comprising: a first input terminal for inputting the first input signal with the frequency $f_0$; a second input terminal for inputting the second input signal with the frequency $f_0$; a first frequency multiplier electrically connected to the second input terminal for receiving the second input signal with the frequency $f_0$ so as to generate a second frequency multiplied signal having a frequency component of $2f_0$; a second frequency multiplier electrically connected to the first input terminal for receiving the first input signal with frequency $f_0$ so as to generate a first frequency multiplied signal having a frequency component of $2f_0$; a first mixer electrically connected to the first input terminal and the first frequency multiplier for receiving and mixing the first input signal with the frequency $f_0$ and the second frequency multiplied signal having the frequency component of $2f_0$ so as to generate a first output signal having a frequency component of $3f_0$; a second mixer electrically connected to the second input terminal and the second frequency multiplier for receiving and mixing the second input signal with the frequency $f_0$ and the first frequency multiplied signal having the frequency component of $2f_0$ so as to generate a second output signal having a frequency component of $3f_0$; a first output terminal electrically connected to the first mixer for outputting the first output signal; and a second output terminal electrically connected to the second mixer for outputting the second output signal.

The present invention further provides a method applied in the above-described circuit for implementing frequency tripled I/Q signals, the method comprising the steps of: inputting the first and second input signals respectively through the first and second input terminals, and receiving the first and second input signals through the first and second frequency multipliers so as to generate the first and second frequency multiplied signals respectively; receiving and mixing the first input signal and the second frequency multiplied signal as well as the second inputs signal and the first frequency multiplied signal through the first and second mixers respectively so as to generate the first output signal and the second output signal; and outputting the first and second output signals.

Therefore, according to the present invention, two input signals in quadrature are received by frequency multipliers so as to generate two frequency multiplied signals and then the input signals and the frequency multiplied signals are mixed by mixers so as to generate two output signals in quadrature with each other and having a frequency three times that of the input signals. Therefore, the present invention implements frequency tripled I/Q signals by using a DC bias current reused cascode structure constituted by the frequency multipliers and the mixers. Compared with the prior art, the present invention eliminates the requirement for high amplitude of the input signals as in the prior art, has lower power consumption and broader bandwidth and can be used as high frequency signal sources in any processes.

BRIEF DESCRIPTION OF DRAWINGS

FIG. 5 is a process flow diagram showing a method for implementing frequency tripled I/Q signals according to the present invention.

DETAILED DESCRIPTION OF PREFERRED EMBODIMENTS

The following illustrative embodiments are provided to illustrate the disclosure of the present invention, these and other advantages and effects can be apparent to those skilled in the art after reading the disclosure of this specification.

It should be noted that to make the present invention clear, detailed description of some conventional circuit structures is omitted. Meanwhile, all the drawings are only for illustrative purpose and not intended to limit the present invention.

Figure 1:
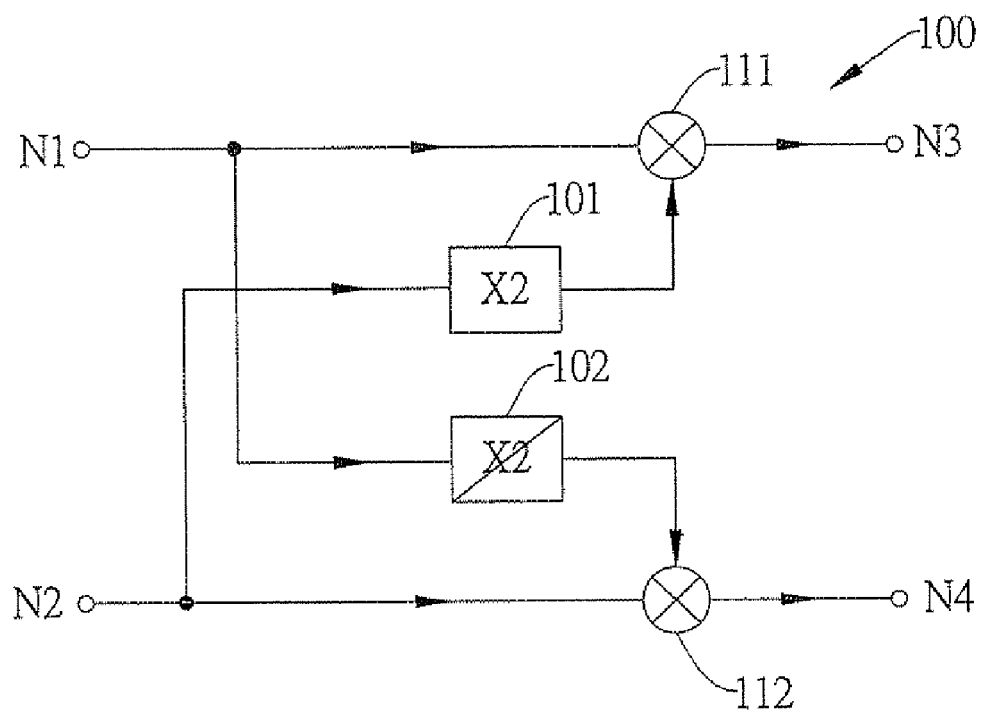
FIG. 1 is a diagram showing a circuit for implementing frequency tripled I/Q signals according to a first embodiment of the present invention.

FIG. 1 shows a circuit for implementing frequency tripled I/Q signals according to a first embodiment of the present invention, wherein a first input signal with a frequency $f_0$ and a second input signal with a frequency $f_0$ and in quadrature with the first input signal are inputted to the circuit. The circuit 100 comprises a first input terminal N1, a second input terminal N2, a first frequency multiplier 101, a second frequency multiplier 102, a first mixer 111, a second mixer 112, a first output terminal N3 and a second output terminal N4.

The components are detailed as follows.

The first input terminal N1 is used for inputting the first input signal with the frequency $f_0$. The second input terminal N2 is used for inputting the second input signal with the frequency $f_0$. The first frequency multiplier 101 is electrically connected to the second input terminal N2 for receiving the second input signal with the frequency $f_0$ so as to generate a second frequency multiplied signal with a frequency $2f_0$. The second frequency multiplier 102 is electrically connected to the first input terminal N1 for receiving the first input signal with the frequency $f_0$ so as to generate a first frequency multiplied signal with a frequency $2f_0$. The first mixer 111 is electrically connected to the first input terminal N1 and the first frequency multiplier 101 for receiving and mixing the first input signal with the frequency $f_0$ and the second frequency multiplied signal with the frequency $2f_0$ so as to generate a first output signal with a frequency of $3f_0$ which is further outputted by the first output terminal N3. The second mixer 112 is electrically connected to the second input terminal N2 and the second frequency multiplier 102 for receiving and mixing the second input signal with the frequency $f_0$ and the first frequency multiplied signal with the frequency $2f_0$ so as to generate a second output signal with a frequency of $3f_0$ which is further outputted by the second output terminal N4.

For example, the first input signal with a frequency $f_0$ from the first input terminal N1 and the second frequency multiplied signal with a frequency $f_1$ ($2f_0$) from the first frequency multiplier 101 are mixed by the first mixer 111 so as to generate the first output signal with a frequency of $f_0+f_1$ (at least $3f_0$) at the first output terminal N3.

For example, the second input signal with a frequency $f_2$ from the second input terminal N2 and the first frequency multiplied signal with a frequency $f_4$ ($2f_2$) from the second frequency multiplier 102 are mixed by the second mixer 112 so as to generate the second output signal with a frequency of $f_2+f_4$ (at least $3f_2$) at the second output terminal N4.

It should be noted that the circuit 100 has a DC bias current reused cascode structure. Meanwhile the circuit 100 has an I/Q path coupling circuit structure such that when the first input signal and the second input signal are not in quadrature, frequency tripling does not occur to the first input signal and the second input signal. Instead, the first and second input signals remain unchanged.

In the present embodiment, the first frequency multiplier 101, the second frequency multiplier 102, the first mixer 111 and the second mixer 112 are implemented with BJT or FET transistors.

As described above, the first output signal and the second output signal outputted by the first output terminal N3 and the second output terminal N4 have an effect of summing up the frequencies of the first input signal and the second input signal. The gain of the first output signal and the second output signal relative to the first input signal and the second input signal is determined by the phase difference between the first input signal and the second input signal and the type of the loads of the first mixer 111 and the second mixer 112.

Figure 2:
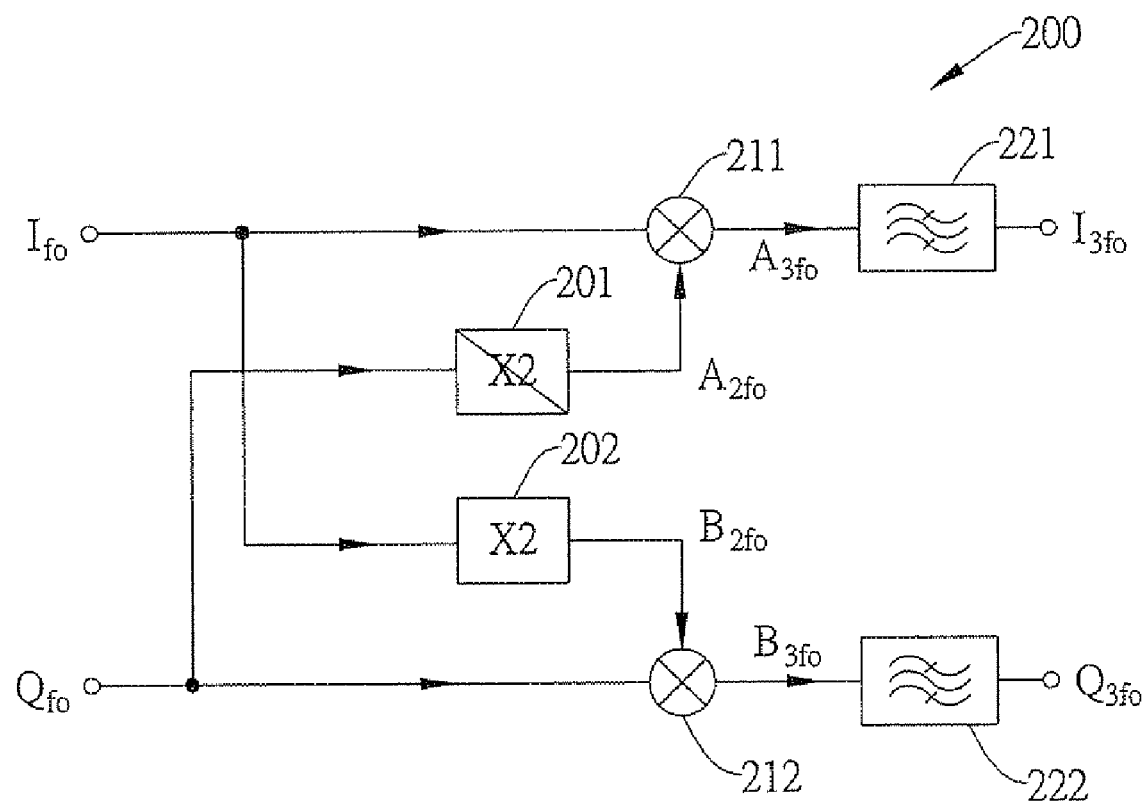
FIG. 2 is a diagram showing a circuit for implementing frequency tripled I/Q signals according to a second embodiment of the present invention.

FIG. 2 shows a circuit for implementing frequency tripled I/Q signals according to a second embodiment of the present invention. The circuit 200 comprises a first frequency multiplier 201, a second frequency multiplier 202, a first mixer 211, a second mixer 212, a first bandpass filter 221 and a second bandpass filter 222.

The components are detailed as follows.

The first input signal $I_{f0}$ and the second input signal $Q_{f0}$ are two groups of differential inputs signals in quadrature and having a frequency $f_0$. The first frequency multiplier 201 receives the second input signal $Q_{f0}$ and outputs a second frequency multiplied signal $A_{2f0}$ with a frequency $2f_0$. The second frequency multiplier 202 receives the first input signal $I_{f0}$ and outputs a first frequency multiplied signal $B_{2f0}$ with a frequency $2f_0$. Then, the first mixer 211 mixes the first input signal $I_{f0}$ and the second frequency multiplied signal $A_{2f0}$ so as to generate a first output signal $A_{3f0}$ with a frequency $3f_0$. The second mixer 212 mixes the second input signal $Q_{f0}$ and the first frequency multiplied signal $B_{2f0}$ so as to generate a second output signal $B_{3f0}$ with a frequency $3f_0$. Therein, the first output signal $A_{3f0}$ and the second output signal $B_{3f0}$ are in quadrature with each other.

It should be noted that a big difference of the present embodiment from the first embodiment is: the first output signal $A_{3f0}$ and the second output signal $B_{3f0}$ may respectively comprise other harmonic frequency bands, which are accordingly filtered out in the present embodiment by the first bandpass filter 221 and the second bandpass filter 222, thereby obtaining a desired first output signal $I_{3f0}$ and a desired second output signal $Q_{3f0}$, as shown in FIG. 2. Of course, the first bandpass filter 221 and the second bandpass filter 222 can be designed according to the desired frequency bands.

Figure 3:
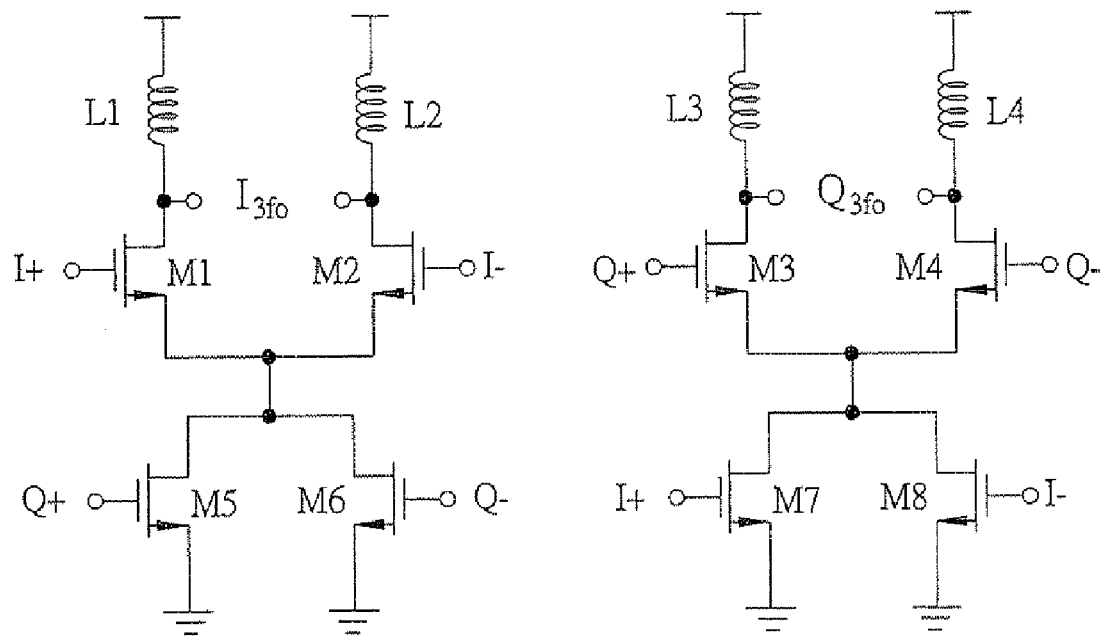
FIG. 3 is a diagram showing a circuit for implementing frequency tripled I/Q signals, with the load consisting of inductive elements.

FIG. 3 shows a circuit for implementing frequency tripled I/Q signals with the load consisting of inductive elements. The circuit comprises: two frequency multipliers respectively formed by differential transistor pairs M5-M6 and M7-M8, two mixers respectively formed by differential transistor pairs M1-M2 and M3-M4, and loads formed by inductive elements L1, L2, L3, L4. In the present embodiment, the input signals are differential signals I (I+ and I−) and Q (Q+ and Q−) with a same frequency and in quadrature with each other.

The components are detailed as follows.

The differential signal I (I+ and I−) is inputted to the gates of the differential transistor pair M1-M2 and the gates of the differential transistor pair M7-M8. Meanwhile, the differential signal Q (Q+ and Q−) is inputted to the gates of the differential transistor pair M3-M4 and the gates of the differential transistor pair M5-M6.

The differential signal Q is frequency multiplied by the differential transistor pair M5-M6 functioning as a frequency multiplier so as to generate a frequency multiplied signal with a frequency twice that of the differential signal Q at the common drains of the differential transistor pair M5-M6. Meanwhile, the differential signal I is frequency multiplied by the differential transistor pair M7-M8 functioning as a frequency multiplier so as to generate a frequency multiplied signal with a frequency twice that of the differential signal I at the common drains of the differential transistor pair M7-M8. The common drains of the differential transistor pairs M5-M6 and M7-M8 are electrically connected to the common sources of the differential transistor pairs M1-M2 and M3-M4, respectively.

The differential transistor pair M1-M2 functioning as a mixer mixes the differential signal I from the gates thereof and the frequency multiplied signal from the common sources thereof so as to produce a signal $I_{3f0}$ at least with a frequency three times that of the signal I at the drains thereof.

Meanwhile, the differential transistor pair M3-M4 functioning as a mixer mixes the differential signal Q from the gates thereof and the frequency multiplied signal from the common sources thereof so as to produce a signal $Q_{3f0}$ at least with a frequency three times that of the signal Q at the drains thereof.

The output signals $I_{3f0}$ and $Q_{3f0}$ are differential I/Q signals, which have maximum amplitude by mixing the inputted I/Q signals with a phase difference of 90 degrees.

The loads of the mixers formed by M1-M2 and M3-M4 are inductive elements $L_1$, $L_2$, $L_3$ and $L_4$. By choosing suitable inductive elements, the gain of the signals $I_{3f0}$ and $Q_{3f0}$ at high frequency can be increased.

Figure 4:
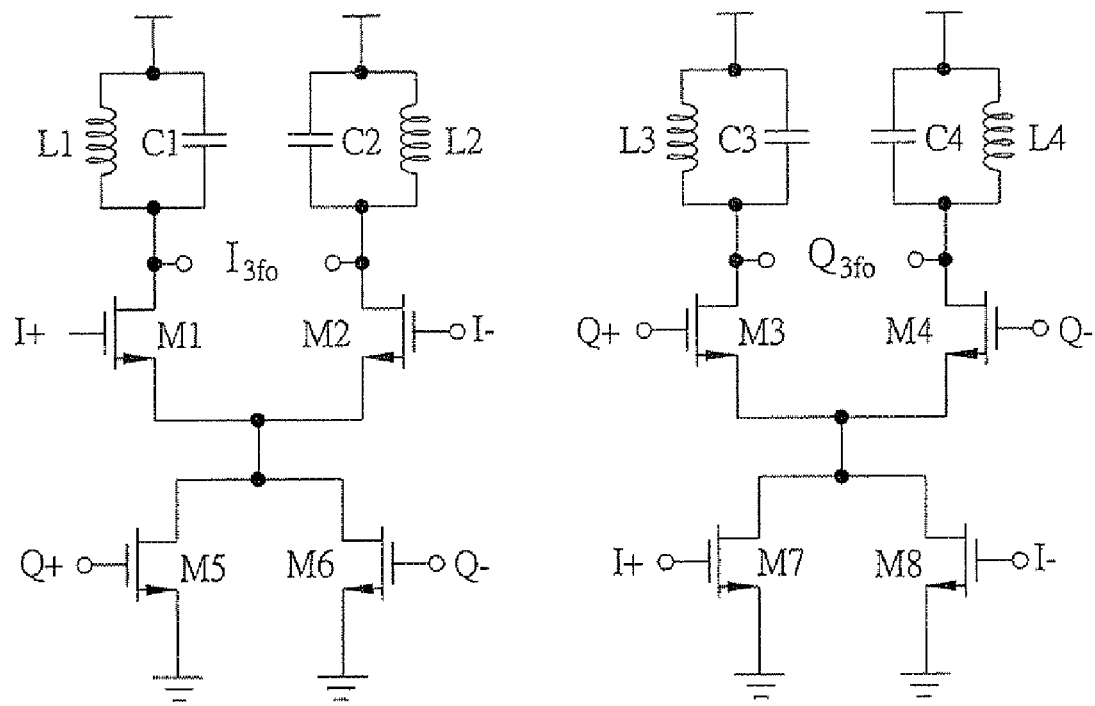
FIG. 4 is a diagram showing a circuit for implementing frequency tripled I/Q signals, with the load consisting of LC resonant circuits.

FIG. 4 shows a circuit for implementing frequency tripled I/Q signals with the loads consisting of LC resonant circuits. The circuit in FIG. 4 has a same structure as shown in FIG. 3, except that the circuit in FIG. 4 further comprises capacitor loads C1, C2, C3, C4. The capacitor C1 is connected in parallel with the inductor L1 to form a LC resonant circuit, and the capacitor C2 is connected in parallel with the inductor L2 to form a LC resonant circuit. Meanwhile, the capacitor C3 is connected in parallel with the inductor L3 to form a LC resonant circuit, and the capacitor C4 is connected in parallel with the inductor L4 to form a LC resonant circuit.

By choosing suitable inductor and capacitor elements, the gain of the first output signal $I_{3f0}$ and the second output signal $Q_{3f0}$ relative to the first input signal $I_{f0}$ and the second input signal $Q_{f0}$ can be maximized.

FIG. 5 shows a method for implementing frequency tripled I/Q signals according to the present invention.

First, at step 500, the first input signal and the second input signal are respectively inputted through the first input terminal and the second input terminal and received by the first frequency multiplier and the second frequency multiplier, thereby generating the first frequency multiplied signal and second frequency multiplied signal.

At step 501, the first input signal and the second frequency multiplied signal are received and mixed by the first mixer and the second input signal and the first frequency multiplied signal are received and mixed by the second mixer, thereby generating the first output signal and the second output signal.

At step 502, the first output signal and the second output signal are outputted.

According to the present invention, two input signals in quadrature are received by frequency multipliers so as to generate two frequency multiplied signals and then the input signals and the frequency multiplied signals are mixed by mixers so as to generate two output signals in quadrature with each other and having a frequency three times that of the input signals. Therefore, the present invention implements frequency tripled I/Q signals by using a DC bias current reused cascode structure constituted by the frequency multipliers and the mixers. Compared with the prior art, the present invention eliminates the requirement for high amplitude of the input signals as in the prior art, has lower power consumption and broader bandwidth and can be used as high frequency signal sources in any single chip processes.

The above-described descriptions of the detailed embodiments are only to illustrate the preferred implementation according to the present invention, and it is not to limit the scope of the present invention. Accordingly, all modifications and variations completed by those with ordinary skill in the art should fall within the scope of present invention defined by the appended claims.

What is claimed is:

1. A circuit for implementing frequency tripled I/Q signals, wherein a first input signal with a frequency $f_0$ and a second input signal with a frequency $f_0$ and in quadrature with the first input signal are inputted to the circuit, the circuit comprising:

a first input terminal for inputting the first input signal;

a second input terminal for inputting the second input signal;

a first frequency multiplier electrically connected to the second input terminal for receiving the second input signal so as to generate a second frequency multiplied signal with a frequency of $2f_0$;

a second frequency multiplier electrically connected to the first input terminal for receiving the first input signal so as to generate a first frequency multiplied signal with a frequency of $2f_0$;

a first mixer electrically connected to the first input terminal and the first frequency multiplier for receiving and mixing the first input signal and the second frequency multiplied signal so as to generate a first output signal with a frequency of $3f_0$;

a second mixer electrically connected to the second input terminal and the second frequency multiplier for receiving and mixing the second input signal and the first frequency multiplied signal so as to generate a second output signal with a frequency of $3f_0$;

a first output terminal electrically connected to the first mixer for outputting the first output signal; and a second output terminal electrically connected to the second mixer for outputting the second output signal.

2. The circuit of claim 1, wherein the circuit has an I/Q path coupling circuit structure such that when a third input signal and a fourth input signal not in quadrature with the third input signal are input to the circuit, frequency tripling does not occur to the third and fourth input signals.

3. The circuit of claim 1, further comprising a first bandpass filter electrically connected to the first output terminal for filtering the first output signal, and a second bandpass filter electrically connected to the second output terminal for filtering the second output signal.

4. The circuit of claim 1, wherein at least one of the first frequency multiplier, the second frequency multiplier, the first mixer and the second mixer is implemented with BJT or FET transistors.

5. The circuit of claim 1, wherein the second input signal is a differential input signal, the first frequency multiplier is formed by a common drain differential transistor pair, a positive portion of the second input signal is received by one of two gates of the common drain differential transistor pair, a negative portion of the second input signal is received by the other of the two gates of the common drain differential transistor pair, and the second frequency multiplied signal is generated at drains of the common drain differential transistor pair.

6. The circuit of claim 1, wherein the first input signal is a differential input signal, the second frequency multiplier is formed by a common drain differential transistor pair, a positive portion of the first input signal is received by one of two gates of the common drain differential transistor pair, a negative portion of the first input signal is received by the other of the two gates of the common drain differential transistor pair, and the first frequency multiplied signal is generated at drains of the common drain differential transistor pair.

7. The circuit of claim 1, wherein the first input signal is a differential input signal, the first mixer is formed by a common source differential transistor pair, a positive portion of the first input signal is received by one of two gates of the common source differential transistor pair, a negative portion of the first input signal is received by the other of the two gates of the common source differential transistor pair, the second frequency multiplied signal generated by the first frequency multiplier is received by sources of the common source differential transistor pair, and the first output signal is generated at drains of the common source differential transistor pair.

8. The circuit of claim 1, wherein the second input signal is a differential input signal, the second mixer is formed by a common source differential transistor pair, a positive portion of the second input signal is received by one of two gates of the common source differential transistor pair, a negative portion of the second input signal is received by the other of the two gates of the common source differential transistor pair, the first frequency multiplied signal generated by the second frequency multiplier is received by the sources of the differential pair, and the second output signal is generated at the drains of the differential pair.

9. The circuit of claim 1, wherein the first mixer and the second mixer have output loads that are inductive elements or LC resonant circuits, and the output loads maximize a first gain of the first output signal relative to the first input signal and a second gain of the second output signal relative to the second input signal.

10. The circuit of claim 1, wherein the first mixer and the first frequency multiplier, and the second mixer and the second frequency multiplier form a DC bias current reused cascode structure.

11. A method applied in the circuit of claim 1 for implementing frequency tripled I/Q signals, comprising the steps of:
inputting the first and second input signals respectively through the first and second input terminals, and receiving the first and second input signals through the first and second frequency multipliers so as to generate the first and second frequency multiplied signals respectively;
receiving and mixing the first input signal and the second frequency multiplied signal as well as the second input signal and the first frequency multiplied signal through the first and second mixers respectively so as to generate the first output signal and the second output signal; and
outputting the first and second output signals.

12. The method of claim 11, further comprising filtering the first and second output signals by a first bandpass filter and a second bandpass filter, respectively.

13. The method of claim 11, wherein at least one of the first frequency multiplier, the second frequency multiplier, the first mixer and the second mixer are implemented with BJT or FET transistors.

14. The method of claim 11, wherein the first frequency multiplier is formed by a common drain differential transistor pair, the second input signal is received by gates of the common drain differential transistor pair, and the second frequency multiplied signal is generated at drains of the common drain differential transistor pair.

15. The method of claim 11, wherein the second frequency multiplier is formed by a common drain differential transistor pair, the first input signal is received by gates of the common drain differential transistor pair, and the first frequency multiplied signal is generated at drains of the common drain differential transistor pair.

16. The method of claim 11, wherein the first mixer is formed by a common source differential transistor pair, the first input signal is received by gates of the common source differential transistor pair, the second frequency multiplied signal generated by the first frequency multiplier is received by sources of the common source differential transistor pair, and the first output signal is generated at drains of the common source differential transistor pair.

17. The method of claim 11, wherein the second mixer is formed by a common source differential transistor pair, the second input signal is received by gates of the common source differential transistor pair, the first frequency multiplied signal generated by the second frequency multiplier is received by sources of the common source differential transistor pair, and the second output signal is generated at drains of the common source differential transistor pair.

18. The method of claim 11, wherein output loads of the first mixer and the second mixer are inductive elements or LC resonant circuits, and the output loads maximize a first gain of the first output signal relative to the first input signal and a second gain of the second output signal relative to the second input signal.

19. The method of claim 11, wherein the first mixer and the first frequency multiplier, and the second mixer and the second frequency multiplier respectively form a DC bias current reused cascode structure.

* * * * *